(12) United States Patent
Junker et al.

(10) Patent No.: US 6,450,435 B2
(45) Date of Patent: Sep. 17, 2002

(54) SEAT BELT PRETENSIONER

(75) Inventors: Klaus Junker, Munich (DE); Andreas Knych, Munich (DE)

(73) Assignee: Breed Automotive Technoloty, Inc., Lakeland, FL (US)

(*) Notice: Subject to any disclaimer, the term of this patent is extended or adjusted under 35 U.S.C. 154(b) by 63 days.

(21) Appl. No.: 09/785,993

(22) Filed: Feb. 15, 2001

(30) Foreign Application Priority Data

May 31, 2000 (DE) .......................................... 100 27 212

(51) Int. Cl.⁷ .............................................. B60R 22/46
(52) U.S. Cl. ........................... 242/374; 280/806; 60/632
(58) Field of Search ........................ 242/374; 280/806; 297/478, 480; 60/632, 638

(56) References Cited

U.S. PATENT DOCUMENTS

| | | | |
|---|---|---|---|
| 4,372,501 A | 2/1983 | Inukai | |
| 5,842,344 A | 12/1998 | Schmid | 60/632 |
| 6,155,512 A | * 12/2000 | Specht et al. | 242/374 |
| 6,299,090 B1 | * 10/2001 | Specht et al. | 242/374 |

FOREIGN PATENT DOCUMENTS

| | | |
|---|---|---|
| DE | 29520307 | 4/1996 |
| DE | 19837927 | 3/2000 |
| DE | 19927270 | 1/2001 |
| DE | 19939499 | 2/2001 |

* cited by examiner

Primary Examiner—John M. Jillions
(74) Attorney, Agent, or Firm—Lonnie Drayer

(57) ABSTRACT

A device for activating a seat belt pretensioner comprising a piston that can be driven by a propellant gas in a tubular piston guide. A pressure chamber, in which the propellant gas acts upon the piston and a weak point provided in an opening in a wall of the piston, which ruptures under excess working pressure in the pressure chamber. The weak point is a plastic deformable membrane, which is deformed into a dome shape under excess pressure in the pressure chamber and ruptures in the region of the dome-shaped deformation. The seat belt pretensioner has a belt reel associated with blocking teeth, and a blocking pawl. The time required for the membrane to be deformed and rupture is sufficient for the blocking pawl to securely engage the blocking teeth thereby blocking the belt reel against rotation in a direction of belt extraction.

6 Claims, 4 Drawing Sheets

SEAT BELT PRETENSIONER

FIELD OF THE INVENTION

The invention relates to a seat belt pretensioner.

DISCUSSION OF THE PRIOR ART

U.S. Pat. No. 5,842,344 teaches a seat belt pretensioner with a piston activated by a pyrotechnic generated propellant gas in a linear direction in a guide arrangement. In this device the propellant gas acts upon the piston in a pressure chamber. To avoid excess pressure in the pressure chamber, the known device has a blowout patch on a front wall of the piston. The blowout patch has points of intended weakness, via which an evacuation passageway is created under excess pressure in the pressure chamber. In a second embodiment, the front wall of the piston has a small calibrated discharge opening to facilitate the desired pressure reduction. In a third embodiment, the front wall of the piston has a tear-off part which, during the return stroke of the piston at the moment of load limitation, is removed from an evacuation passageway.

SUMMARY OF THE INVENTION

There is provided by the present invention a seat belt pretensioner activated by opening a gas flow port with a controlled time delay, such that after the tensioning stroke of the piston sufficient time remains for a blocking pawl to engage with a belt reel in a blocking position. A weak point, in the form of a plastic deformable membrane, provides for pressure reduction in the pressure chamber via the gas flow port. Deformation of the membrane to such an extent that a gas flow port is created takes time. During this time a main blocking device, in particular a pawl supported on the retractor frame, can engage the belt reel in a blocking position, in particular with blocking teeth on the belt reel. This ensures a secure blocking of the belt reel. In addition it ensures that a load-limiter can come into effect. As a result, excess forces exerted by the secured seat belt on the vehicle occupant are avoided during the forward displacement of the vehicle occupant.

DETAILED DESCRIPTION OF THE INVENTION

Figure 1:
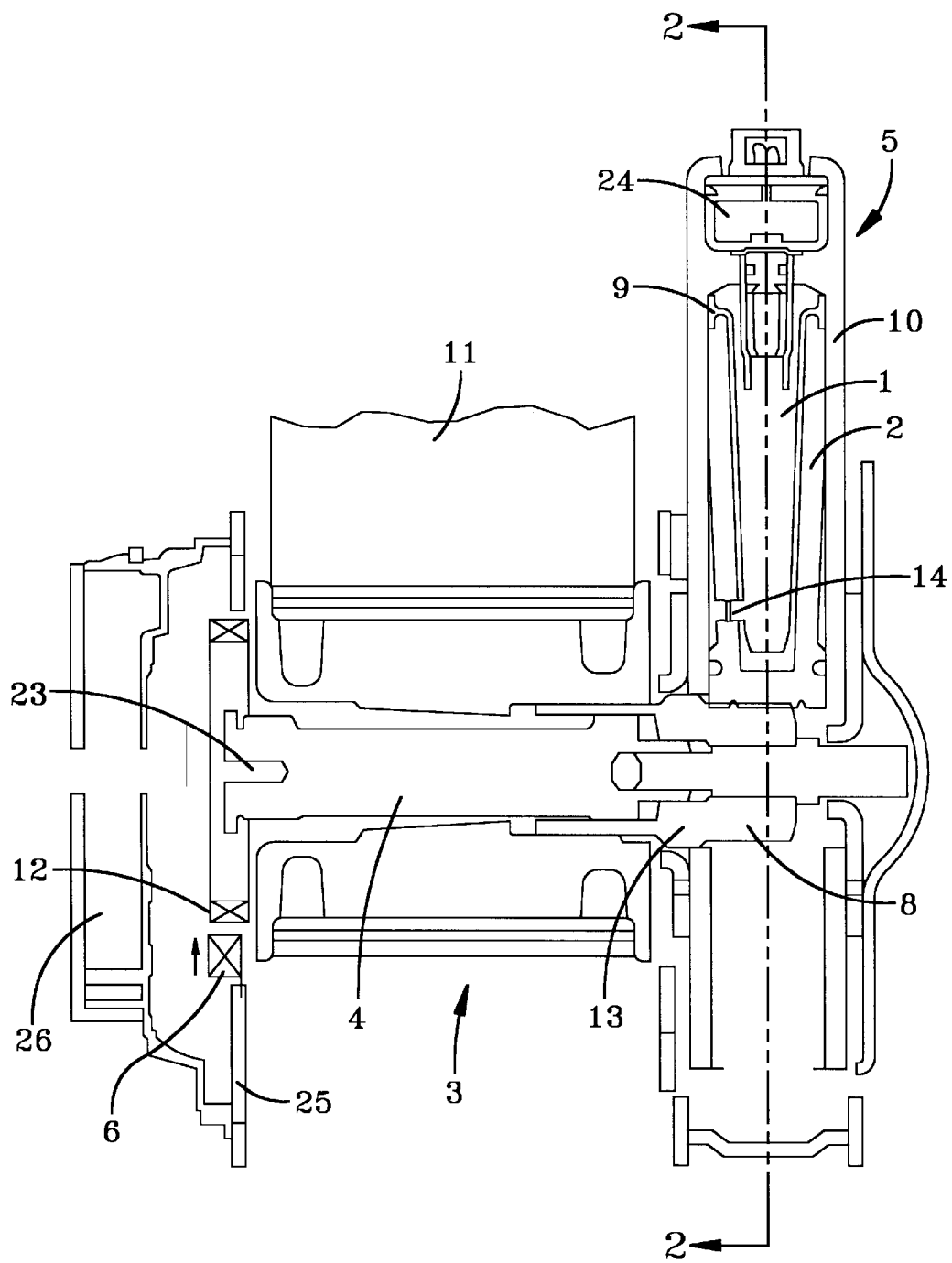
FIG. 1 is a sectional view of a seat belt retractor with a pretensioner according to the invention.
Figure 2:
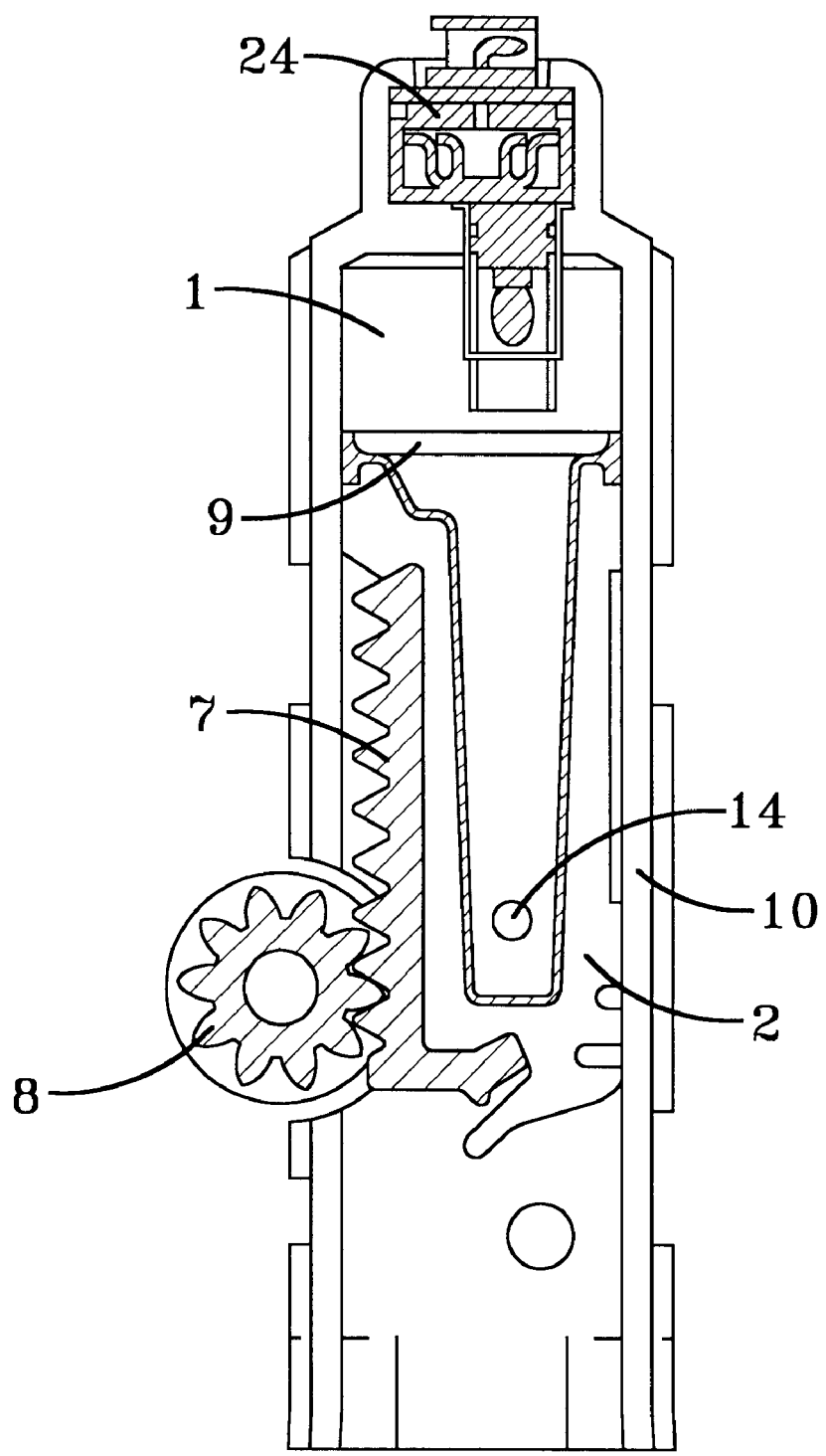
FIG. 2 is a sectional view along line 2—2 of FIG. 1.

The seat belt retractor with a pretensioner represented in section in FIG. 1 comprises a belt reel 3, on which a seat belt 11 can be wound and unwound in the known manner. The belt reel is rotatably mounted in a retractor frame 25 and during normal operation it is tensioned by a motive spring 26. One side of the belt reel (the right side in FIG. 1) is linked to a load-limiter 4 in a rigid or non-rotable manner. The load-limiter can be a torque rod, sometimes referred to as a torsion bar. It is also possible, however, to employ in the invention a load-limiter in the form of adjacent friction linings or in a similar way. The other side of the belt reel 3 (the left side in FIG. 1) cooperates with a blocking device that comprises a blocking pawl 6 supported on the belt retractor frame 25. To attain the blocking position, this blocking pawl 6 engages blocking teeth 12 provided on the belt reel 3. In this way the belt reel is blocked against rotation in the direction of belt extraction. The seat belt retractor of FIG. 1 further comprises a seat belt pretensioner 5. The seat belt pretensioner has a drive unit comprising a piston 2 that is guided in a linear direction in a tubular piston guide 10 (FIGS. 1 and 2). A rotary drive mechanism can be used in place of a linear seat belt pretensioner drive mechanism.

As best shown in FIG. 2, the piston 2 is driven by a propellant gas introduced into a pressure chamber 1. The source 24 of the propellant gas can be a traditional pyrotechnic propellant that can be ignited, a propellant gas supplied by a hybrid gas generator or a propellant gas supplied by another pressure source. The piston is sealed against the inner wall of the tubular piston guide 10 via a seal 9 such as a peripheral sealing lip. The seal also serves as a lining of an inner piston chamber, in which the pressure chamber continues. To drive the piston 2, the propellant gas in the pressure chamber 1 creates a working pressure, causing the piston to move along the tubular guide 10. The piston 2 comprises a toothed rack 7 that meshes with a pinion 8.

As best shown in FIG. 1, the rotational movement of the pinion 8 is transferred via a coupling 13 to the belt reel 3 for the pretensioning of the seat belt 11. The pinion can be linked to the belt reel directly or via a load-limiter 4. The coupling 13 can be omitted, if the toothed rack 7 does not engage the pinion during normal operation of the seat belt retractor.

Residual gas or excess pressure in the pressure chamber 1 after the tensioning of the seat belt could lead to the destruction of the seat belt pretensioner or impair the function of the load-limiter, since the residual gas in the pressure chamber reacts against a return stroke of the piston, which takes place during the load limitation and adds to the energy use of the load-limiter. The present invention ensures that the pressure reduction in the pressure chamber 1 does not occur too quickly, as then the danger arises that the blocking pawl 6, as a result of its inertia, does not have enough time to move into its blocking position and engage the blocking teeth 12. In the represented embodiments it is preferred that the sidewall of the piston 2 include a weak point 14. This weak point 14 comprises a membrane 15 extending across and covering a passageway that will in due course serve as an evacuation passageway. The membrane is preferably circular-shaped and due to excess pressure in the pressure chamber 1, becomes dome-shaped, as is indicated by dashed lines in FIG. 5. In the region of the dome-shaped deformation, further deformation results in the rupture of the membrane resulting in an evacuation passageway for pressure reduction in the pressure chamber 1. The membrane 15 can alternatively have an oval peripheral rim.

During the dome-shaped deformation of the membrane 15, the peripheral rim 16 of the membrane remains linked to the piston wall 17 around its entire circumference. This ensures that the gas evacuation passageway in the region of dome-shaped deformation takes place with a time delay. Within this time frame the blocking pawl 6 can securely move into its blocking position to engage the blocking teeth 12.

During a forward displacement of the vehicle occupant, the belt reel part on which the seat belt 11 is wound can twist with respect to the belt reel part that is fastened by the blocking device (blocking pawl 6, blocking teeth 12). The one end of the load-limiter 4, the left end as shown in FIG. 1, is fastened by the blocking device, since this end of the load-limiter 4 is connected non-rotatably with the belt reel part blocked on the retractor frame 25 via a fixed bearing 23. The other end of the load-limiter 4, the right end as shown in FIG. 1, is connected to the belt reel part on which the seat belt 11 is wound.

Figure 3:
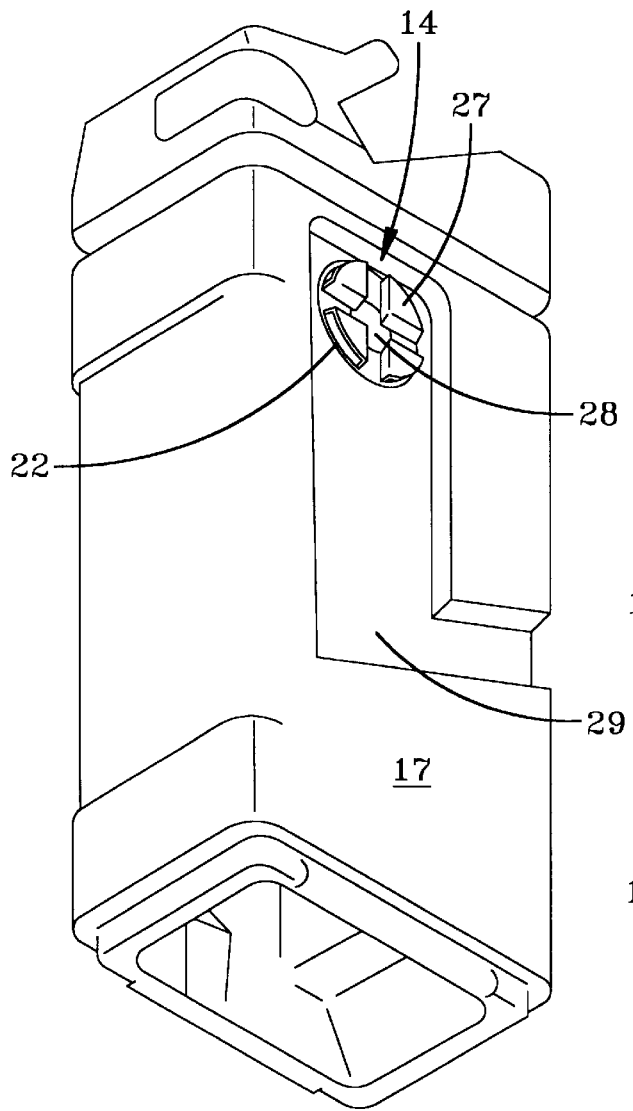
FIG. 3 is a perspective view of a piston of the belt pretensioner with a weak point in the piston sidewall.
Figure 4:
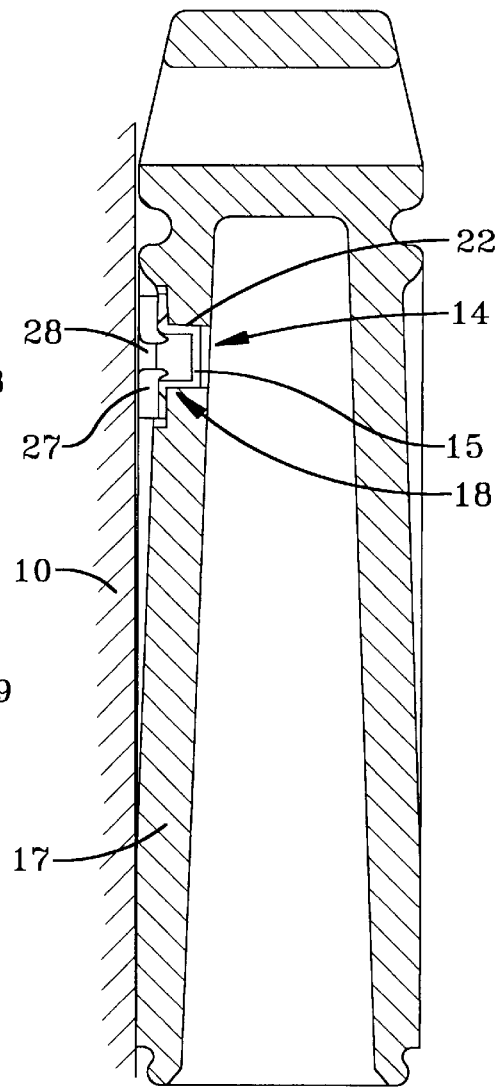
FIG. 4 is a sectional view of the embodiment of the weak point in FIG. 3.
Figure 5:
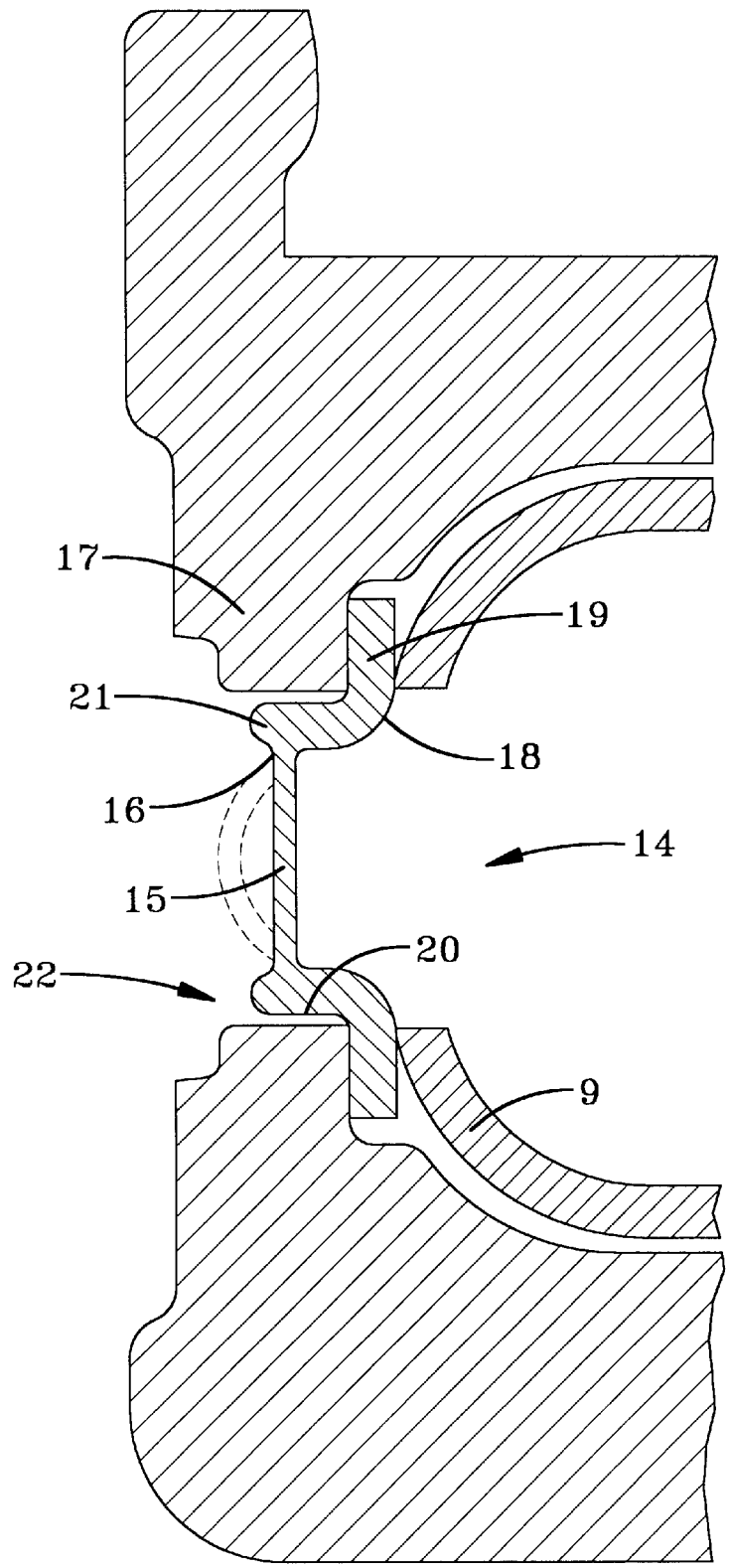
FIG. 5 is a sectional view of a further embodiment of the weak point.

In the embodiments shown a cup-shaped insert 18, which is inserted into an opening 22 in a wall 17 of the piston 2, with the weak points represented in FIGS. 3 to 5 comprising the membrane 15 that forms the bottom of the insert. The insert 18 comprises a radially spaced flange 19. This flange can, however, take on a different form, to ensure a support on the piston wall 17. It is preferable that the insert 18 comprise a cold extrusion part (or a cold extrusion embossed part). The insert, including the membrane, can comprise aluminium or an aluminium alloy.

A peripheral rim 16 of the membrane 15 comprises a reinforcement 21 in the form of a ridge running around the peripheral rim 16. This reinforcement 21 ensures that, under excess pressure in the pressure chamber 1, the membrane 15 initially undergoes a plastic deformation without tearing off the peripheral rim. This ensures that the clearance opening is created after the plastic deformation of the membrane 15 in the region of the dome-shaped deformation (see dashed lines in FIG. 5).

In the embodiments shown in FIGS. 3 and 4, the cup or pot shaped insert 18 is supported from the outside by the piston wall 17. The flange is located in a recess on the outside of the piston wall. The flange 19 may be disposed between an intermediate piece 27, which is arranged between the inner guide wall of the tubular piston guide 10 and the flange. The intermediate piece 27 comprises a central evacuation passageway 28 through which the gas can escape during the reduction of excess pressure in the pressure chamber 1.

In the embodiment shown in FIG. 5, the flange 19 lies against the inner side of the piston wall 17. Due to a seal 9, the flange 19 is pressed against the corresponding flange area on the inside of the piston wall 17. This ensures that the insert 18 is sufficiently fastened in the wall opening 22. The seal 9 comprises in the region of the membrane 15 an opening, via which the pressure in the pressure chamber 1 can act upon the membrane 15. After the formation of the gas evacuation passageway in the deformed membrane, the gas can escape. In the embodiment shown in FIG. 5, the flange 19 is pressed in a self-sealing manner against the inner surface of the piston wall 17 due to the pressure in the pressure chamber 1. This ensures that no gas can escape from the side of the cup-shaped insert. The gas exhaust takes place only after the membrane 15 has undergone a plastic deformation and the gas flow port has been formed in the membrane part.

The outside piston wall can comprise recesses, which form one or several discharge channels 29 for the escaping gas, as is known for instance from DE 199 39 499 A1.

As is shown in FIG. 3, the discharge channel 29 can comprise multiple labyrinth-type turns. This results in gas cooling and reduces residue escaping to the outside.

From the foregoing it will be apparent to those skilled in the art that modifications may be made without departing from the spirit and scope of the invention. The claims are intended to embrace all such modifications.

What is claimed is:

1. A seat belt pretensioner comprising a piston that can be driven by a propellant gas in a tubular piston guide, a pressure chamber in which the propellant gas acts upon the piston, the piston having an outside casing of the piston comprises a discharge channel with multiple labyrinth-type turns, and a deformable membrane provided in an opening in a wall of the piston that ruptures under excess gas pressure in the pressure chamber to allow pressure reduction, the membrane forms the bottom of a cup-shaped insert that is inserted in the opening in the wall of the piston, whereby the insert comprises a flange which is supported in a sealed manner on the wall of the piston, wherein the deformable membrane is deformed into a dome shape by excess pressure in the pressure chamber and ruptures in the region of the dome-shaped deformation, the seat belt pretensioner further comprises a belt reel associated with blocking teeth, and a blocking pawl, the time required for the membrane to be deformed and rupture is sufficient for the blocking pawl to securely engage the blocking teeth thereby blocking the belt reel against rotation in a direction of belt extraction.

2. The seat belt pretensioner according to claim 1 wherein a peripheral rim of the membrane, by which the membrane is linked to the cup wall of the insert, comprises a reinforcement.

3. The seat belt pretensioner according to claim 1 wherein the insert is a cold extrusion part.

4. The seat belt pretensioner according to claim 1 wherein the insert is a cold extrusion embossed part.

5. The seat belt pretensioner according to claim 1 wherein the membrane is located in a sidewall of the piston.

6. The seat belt pretensioner according to claim 1 wherein the flange is supported in a self-sealing manner on the inside of the wall of the piston due to the pressure in the pressure chamber.

* * * * *